(12) United States Patent
Waki et al.

(10) Patent No.: US 6,806,300 B2
(45) Date of Patent: Oct. 19, 2004

(54) WATER-BASED INK COMPOSITION FOR INK-JET PRINTING, INK-JET PRINTING METHOD USING THE SAME AND PRINTED MATTER

(75) Inventors: Minoru Waki, Himeji (JP); Naoki Okamoto, Himeji (JP); Kazuaki Watanabe, Suwa (JP)

(73) Assignees: Mikuni Shikiso Kabushiki Kaisha, Himeji (JP); Seiko Epson Corporation, Suwa (JP)

( * ) Notice: Subject to any disclaimer, the term of this patent is extended or adjusted under 35 U.S.C. 154(b) by 63 days.

(21) Appl. No.: 09/916,316

(22) Filed: Jul. 30, 2001

(65) Prior Publication Data

US 2002/0035172 A1 Mar. 21, 2002

(30) Foreign Application Priority Data

Aug. 1, 2000 (JP) ........................................ 2000-233578

(51) Int. Cl.⁷ .......................... C09D 11/10; C08L 33/02; C08L 33/08; C08L 33/12; C08L 37/00; C08L 25/08
(52) U.S. Cl. ........................ 523/160; 524/517; 524/522; 524/523
(58) Field of Search ................................. 523/160, 161; 106/31.6; 524/556, 560, 561, 577, 517, 522, 523

(56) References Cited

U.S. PATENT DOCUMENTS

| 5,648,405 | A | * | 7/1997 | Ma et al. ...................... 523/160 |
| 5,889,083 | A | * | 3/1999 | Zhu ............................ 523/161 |
| 5,954,866 | A | * | 9/1999 | Ohta et al. ................ 106/31.89 |
| 6,005,023 | A | * | 12/1999 | Anton et al. ................. 523/161 |
| 6,114,411 | A | * | 9/2000 | Nakamura et al. ........... 523/161 |
| 6,239,193 | B1 | * | 5/2001 | Cheng et al. ................ 523/160 |
| 6,274,646 | B1 | * | 8/2001 | Watanabe et al. ............ 523/161 |
| 6,329,446 | B1 | * | 12/2001 | Sacripante et al. .......... 523/161 |

FOREIGN PATENT DOCUMENTS

| EP | 0622429 A2 | 11/1994 |
| EP | 0851013 A2 | 7/1998 |
| EP | 0851014 A2 | 7/1998 |
| EP | 0892024 A1 | 1/1999 |
| EP | 892024 A1 * | 1/1999 |
| EP | 0985715 A2 | 3/2000 |
| JP | 6-248210 | 9/1994 |
| JP | 9-194775 | 7/1997 |
| WO | WO 00/20520 | 4/2000 |

OTHER PUBLICATIONS

European Search Report dated Apr. 10, 2002.

* cited by examiner

*Primary Examiner*—Callie Shosho
(74) *Attorney, Agent, or Firm*—Armstrong, Kratz, Quintos, Hanson & Brooks, LLP

(57) ABSTRACT

A water-based ink composition for ink-jet printing, containing at least pigment, a dispersing resin, a surface active agent, an organic solvent and water, in which the pigment is dispersed with the dispersing resin, characterized in that the dispersing resin comprises a copolymer (I) prepared by polymerizing a monomer mixture (I) containing a monomer (A) represented by the formula (I), a monomer (B) represented by the formula (II) and a monomer (C) represented by the formula (III) and a copolymer (II) prepared by polymerizing a monomer mixture (II) containing a monomer (D) represented by the formula (IV) and a monomer (E) represented by the formula (V).

11 Claims, No Drawings

WATER-BASED INK COMPOSITION FOR INK-JET PRINTING, INK-JET PRINTING METHOD USING THE SAME AND PRINTED MATTER

BACKGROUND OF THE INVENTION

The present invention relates to a water-based ink composition for ink-jet printing, an ink-jet printing method using the same and a printed matter. In particular, the present invention relates to a water-based ink composition for ink-jet printing, containing the specific dispersing resin, which is excellent in storing stability for a long period of time, discharging stability and adhesion to medium for printing, and which can be particularly suitably used for ink-jet printing methods; and relates to an ink-jet printing method using the ink composition and a printed matter produced by the printing method.

Conventionally, aqueous dye such as direct dye, acid dye or basic dye has been mainly used as a coloring agent for an ink composition for ink-jet printing. However, the aqueous dye has problems that water resistance of printed matter on paper is poor and that the aqueous dye runs with water. In addition, because the aqueous dye is poor in light resistance, the printed matter produced from the aqueous dye easily fades. Accordingly, the printed matter could not be stored for a long period of time. In order to dissolve the above problems, as disclosed in Japanese Unexamined Patent Publication No. 248210/1994 and Japanese Unexamined Patent Publication No. 194775/1997, an attempt to use pigment together with a resin has been carried out.

Recently, in accordance with a shift for a color and high-speed ink-jet printer, the so-called super penetrating ink is mainly used as ink for ink-jet printer. The super penetrating ink can penetrate in a moment after adhesion to a medium for printing. In order to impart penetrating property to ink, a penetrating agent such as a surface active agent or a penetrating solvent is added thereto. However, the penetrating agent has a problem that stable dispersion of pigment is hindered. Accordingly, it is necessitated to develop an ink composition containing pigment, of which storing stability for a long period of time can be maintained in spite of its super penetrating composition.

Furthermore, in order to produce a much close print, it is necessitated to improve impact accuracy of ink. However, it is necessitated to keep discharging stability of nozzle in order to improve impact accuracy of ink. In addition, there is a problem that it is necessitated to improve adhesion of ink to medium for printing in the existing circumstances.

An object of the present invention is to provide a water-based ink composition for ink-jet printing, which is excellent in storing stability for a long period of time in spite of its super penetrating composition, discharging stability without blinding of nozzle and adhesion to medium for printing at the same time, based on the selective use of the specific dispersing resin.

This and other objects of the present invention will become apparent from the description hereinafter.

SUMMARY OF THE INVENTION

In accordance with the present invention, there is provided
(1) a water-based ink composition for ink-jet printing, containing at least pigment, a dispersing resin, a surface active agent, an organic solvent and water, in which the pigment is dispersed with the dispersing resin, characterized in that the dispersing resin comprises a copolymer (I) prepared by polymerizing a monomer mixture (I) containing a monomer (A) represented by the formula (I):

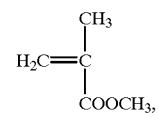

(I)

a monomer (B) represented by the formula (II):

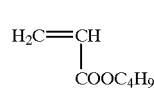

(II)

and a monomer (C) represented by the formula (III):

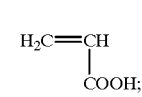

(III)

and a copolymer (II) prepared by polymerizing a monomer mixture (II) containing a monomer (D) represented by the formula (IV):

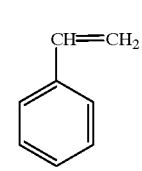

(IV)

and a monomer (E) represented by the formula (V):

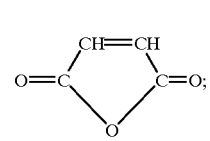

(V)

(2) an ink-jet printing method characterized by discharging drops of the above water-based ink composition for ink-jet printing, fixing the drops to a medium for printing, and printing; and (3) a printed matter produced by the above ink-jet printing method.

DETAILED DESCRIPTION

The water-based ink composition for ink-jet printing of the present invention contains at least pigment, a dispersing resin, a surface active agent, an organic solvent and water, and the pigment is dispersed with the dispersing resin. In addition, the dispersing resin is the specific resin which comprises a copolymer (I) prepared by polymerizing a monomer mixture (I) containing a monomer (A) represented by the formula (I):

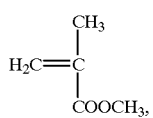

(I)

a monomer (B) represented by the formula (II):

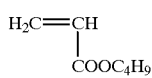

(II)

and a monomer (C) represented by the formula (III):

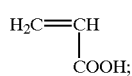

(III)

and a copolymer (II) prepared by polymerizing a monomer mixture (II) containing a monomer (D) represented by the formula (IV):

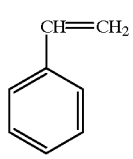

(IV)

and a monomer (E) represented by the formula (V):

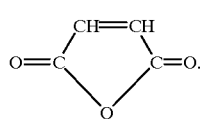

(V)

The kind of the pigment used for the water-based ink composition for ink-jet printing of the present invention is not particularly limited. Various organic pigment and various inorganic pigment can be used.

Examples of the inorganic pigment are, for instance, carbon black prepared by furnace method, channel method, acetylene method or lamp method, graphite, iron oxide black, titanium oxide, chrome yellow, iron oxide yellow, iron oxide red, titan yellow and the like.

Examples of the organic pigment are, for instance, azo pigment such as azo lake, insoluble monoazo pigment, insoluble disazo pigment, condensation azo pigment or chelate azo pigment; polycyclic pigment such as phthalocyanine pigment, perylene pigment, perynone pigment, anthraquinone pigment, quinacridone pigment, dioxazine pigment, thioindigo pigment, isoindolinone pigment or quinophthalone pigment; dye chelate such as basic dye chelate or acidic dye chelate; nitro pigment; nitroso pigment; and the like.

It is desired that the content of the pigment in the water-based ink composition for inkjet printing is at least 0.5% by weight, preferably at least 2% by weight so that coloring effect is sufficiently exhibited. It is desired that the content of the pigment in the water-based ink composition for ink-jet printing is at most 25% by weight, preferably at most 10% by weight so that viscosity of the ink composition is adjusted to suitable viscosity for keeping excellent discharging ability.

It is preferable that a pigment dispersion prepared by dispersing the pigment in a water-based medium with a dispersing agent is used. The following dispersing resin comprising the copolymer (I) and the copolymer (II) is used as a dispersing agent.

The copolymer (I) and the copolymer (II) are dispersing agents in the present invention. The copolymer (I) and the copolymer (II) are prepared by polymerizing the monomer mixture (I) containing the specific monomers and polymerizing the monomer mixture (II) containing the specific monomers, respectively. One of the great characteristics of the present invention is that the copolymer (I) and the copolymer (II) are used as the dispersing resins at the same time.

The monomer mixture (I) for the copolymer (I) contains the monomer (A), the monomer (B) and the monomer (C). Because storage stability for a long period of time of the ink composition is kept, and adhesion and water resistance of the ink composition are sufficiently exhibited, it is desired that the amount of the monomer (A) in the monomer mixture (I) is at least 20% by weight, preferably at least 25% by weight, the amount of the monomer (B) in the monomer mixture (I) is at least 3% by weight, preferably at least 5% by weight, and the amount of the monomer (C) in the monomer mixture (I) is at least 3% by weight, preferably at least 5% by weight and also, it is desired that the amount of the monomer (A) in the monomer mixture (I) is at most 90% by weight, preferably at most 80% by weight, the amount of the monomer (B) in the monomer mixture (I) is at most 50% by weight, preferably at most 45% by weight, and the amount of the monomer (C) in the monomer mixture (I) is at most 40% by weight, preferably at most 35% by weight.

The monomer mixture (II) for the copolymer (II) contains the monomer (D) and the monomer (E). Because dispersibility of the pigment is more improved, and generation of coarse particles is inhibited, it is desired that the amount of the monomer (D) in the monomer mixture (II) is at least 10% by weight, preferably at least 20% by weight, and the amount of the monomer (E) in the monomer mixture (II) is at least 5% by weight, preferably at least 10% by weight and also, it is desired that the amount of the monomer (D) in the monomer mixture (II) is at most 95% by weight, preferably at most 90% by weight, and the amount of the monomer (E) in the monomer mixture (II) is at most 90% by weight, preferably at most 80% by weight.

A process for preparing the copolymer (I) and a process for preparing the copolymer (II) are not particularly limited. The monomer mixture (I) containing the desired amount of the monomer (A), the monomer (B) and the monomer (C), or the monomer mixture (II) containing the desired amount of the monomer (D) and the monomer (E) is, as occasion demands, dissolved in a solvent such as toluene, xylene or benzene to give a mixture solution. A polymerization initiator such as azobisisobutyronitrile is added to the mixture solution, and they are subjected to polymerization. Usually, there are a suspension polymerization method, a bulk polymerization method and a solution polymerization method. In general, from the viewpoint of control on polymerization temperature and workability, the solution polymerization method is preferable. Usually, the thus prepared copolymer (I) and the copolymer (II) are random copolymers.

The copolymer (I) is concerned in storage stability of the ink composition for a long period of time. The copolymer (I)

shows effect for keeping stable system even in an ink composition containing an organic solvent in a large amount, and exhibits excellent adhesion to medium for printing.

From the viewpoint of solubility of the dispersing resin, it is desired that the acid value based on carboxyl group of the copolymer (I) is at least 30 KOHmg/g, preferably at least 35 KOHmg/g. From the viewpoint of interaction of the copolymer (I) with the organic solvent in the ink composition, it is desired that the acid value based on carboxyl group of the copolymer (I) is at most 100 KOHmg/g, preferably at most 90 KOHmg/g.

The copolymer (II) shows effect for improving dispersibility of the pigment and effect for considerably stabling discharging ability of the ink composition without blinding of nozzle.

From the viewpoint of improving dispersibility of the pigment and stability with the passage of time of the ink composition, it is desired that the acid value based on carboxyl group of the copolymer (II) is at least 100 KOHmg/g, preferably at least 120 KOHmg/g. From the viewpoint of keeping water resistance of the ink composition, it is desired that the acid value based on carboxyl group of the copolymer (II) is at most 250 KOHmg/g, preferably at most 220 KOHmg/g.

In consideration of the above effects from each of the copolymer (I) and the copolymer (II), it is desired that the weight ratio of the copolymer (I) to the copolymer (II) (copolymer (I)/copolymer (II)) is at least 20/80, preferably at least 25/75, and is at most 98/2, preferably at most 95/5 so that ability of the copolymer (I) and the copolymer (II) is sufficiently exhibited. In addition, it is preferable that both of the copolymer (I) and the copolymer (II) are random copolymers.

It is desired that the content of the dispersing resin comprising the copolymer (I) and the copolymer (II) is at least 10% by weight, preferably at least 15% by weight, based on the amount of the pigment so that the pigment is sufficiently dispersed. It is desired that the content of the dispersing resin is at most 50% by weight, preferably at most 40% by weight, based on the amount of the pigment so that viscosity of the ink composition does not become high and resins which are not concerned in dispersion and adsorption of the pigment do not impart bad influence to ink property.

In the present invention, it is preferable that a pigment dispersion prepared by dispersing the pigment in a water-based medium with a dispersing agent is used. The above dispersing resin comprising the copolymer (I) and the copolymer (II) is used as a dispersing agent.

Concretely, it is preferable that a neutralized salt is used. The neutralized salt is prepared by neutralizing the dispersing resin with an alkalizing agent such as ammonia, monoethanolamine, triethanolamine, morpholine, triethylamine, sodium hydroxide, potassium hydroxide or lithium hydroxide.

In the present invention, the following other dispersing resin can be used in addition to the above dispersing resin. Examples of the other dispersing resin are, for instance, styrene-acrylic acid copolymer, styrene-methylstyrene-acrylic acid copolymer, styrene-acrylic acid-acrylic ester copolymer ("acrylic ester" shows lower alkyl ester having about 1 to 4 carbon atoms of acrylic acid, hereinafter referred to as the same), styrene-methacrylic acid copolymer, styrene-methacrylic acid-acrylic ester copolymer; styrene-methylstyrene-maleic acid copolymer, styrene-maleic acid-methacrylic ester copolymer, styrene-acrylic ester-styrene sulfonic acid copolymer, styrene-methacryl sulfonic acid copolymer, styrene-acrylic ester-allyl sulfonic acid copolymer; a neutralized salt of each copolymer with an alkali; and the like. These can be used alone or in admixture thereof.

The surface active agent used in the present invention shows effect for improving discharging stability of the water-based ink composition for ink-jet printing. The kind of the surface active agent is not particularly limited. Various anionic surface active agents, various cationic surface active agents, various amphoteric surface active agents and various nonionic surface active agents can be used alone or in admixture thereof.

Examples of the anionic surface active agent are, for instance, a higher fatty acid salt, a salt of higher alcohol with sulfuric ester, an alkylbenzenesulfonic acid salt, an alkylnaphthalenesulfonic acid salt, a salt of condensate of naphthalenesulfonic acid with formalin, an alkylsulfosuccinic acid salt, an alkylphospholic ester salt, an alkyl ether sulfuric acid salt, a salt of polyoxyethylene alkyl phenyl ether with sulfuric acid and the like.

Examples of the cationic surface active agent are, for instance, a fatty amine salt, a quaternary ammonium salt, a sulfonium salt, a phosphonium salt, a fatty trimethylammoniumchloride and the like.

Examples of the amphoteric surface active agent are, for instance, an alkyl betaine, an aminocarboxylic acid salt, lecithin and the like.

Examples of the nonionic surface active agent are, for instance, a polyoxyethylene alkyl ether, a polyoxyethylene alkyl phenyl ether, an ester of polyethylene glycol with fatty acid, a fatty monoglyceride, an ester of polyglycerin with fatty acid, an ester of sorbitan with fatty acid, an ester of propylene glycol with fatty acid, an ester of sucrose with fatty acid and the like.

From the viewpoint that effect for improving charging stability is great, among the above surface active agents, a compound represented by the formula (VI):

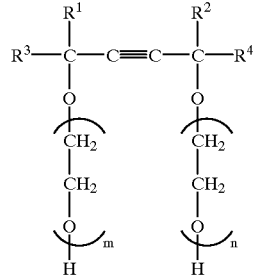

(VI)

in which each of $R^1$, $R^2$, $R^3$ and $R^4$ is independently an alkyl group having 1 to 5 carbon atoms, and the total of m and n is an integer of 1 to 40 is preferably used in the present invention.

Examples of the compound represented by the formula (VI) are, for instance, OLFINE Y, OLFINE E1010, Surfynol 82, Surfynol 440, Surfynol 465 and Surfynol 485. These are commercial name and are made by Air Products and Chemicals Inc.

It is desired that the content of the surface active agent in the water-based ink composition for ink-jet printing is at least 0.1% by weight, preferably at least 0.2% by weight so that charging stability of the ink composition is sufficiently improved, and that wettability and penetrating property to a medium for printing are sufficiently kept. It is desired that the content of the surface active agent in the water-based ink composition for ink-jet printing is at most 5% by weight, preferably at most 4% by weight so that discharging stability of the ink composition is kept, and that discharging nonuniformity of nozzle and bubbling due to high viscosity are lowered.

Examples of the organic solvent used in the water-based ink composition for ink-jet printing of the present invention are, for instance, an organic solvent having high boiling point and the like. The organic solvent having high boiling point shows effect for preventing blinding of head by stopping dry of the ink composition.

Concrete examples of the organic solvent having high boiling point are, for instance, a polyvalent alcohol such as ethylene glycol, diethylene glycol, triethylene glycol, polyethylene glycol, polypropylene glycol, butylene glycol, 1,2, 6-hexanetriol, thioglycol, hxylene glycol, glycerin, trimethylol ethane or trimethylol propane; 2-pyrrolidone; N-methyl-2-pyrrolidone; and the like.

The content of the organic solvent in the water-based ink composition for ink-jet printing is not particularly limited. It is desired that the content of the organic solvent in the water-based ink composition for ink-jet printing is at least 0.5% by weight, preferably at least 2% by weight so that blinding of head is prevented by sufficiently stopping dry of the ink composition. It is desired that the content of the organic solvent in the water-based ink composition for ink-jet printing is at most 40% by weight, preferably at most 20% by weight so that discharging ability of the ink composition is not lowered due to high viscosity, and that the ink composition is prevented from remarkably running on a medium for printing such as paper.

It is preferable that a penetrating solvent is added to the water-based ink composition for ink-jet printing of the present invention together with the above organic solvent.

The penetrating solvent shows effects for accelerating penetration to a medium for printing such as paper and for increasing drying speed.

Concrete examples of the penetrating solvent are, for instance, an alkyl ether of polyvalent alcohol such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether or triethylene glycol monobutyl ether; and the like.

The content of the penetrating solvent in the water-based ink composition for ink-jet printing is not particularly limited. It is desired that the content of the penetrating solvent in the water-based ink composition for ink-jet printing is at least 0.5% by weight, preferably at least 2% by weight so that effects for accelerating penetration of the ink composition to a medium for printing such as paper and for increasing drying speed are sufficiently exhibited. It is desired that the content of the penetrating solvent in the water-based ink composition for ink-jet printing is at most 40% by weight, preferably at most 20% by weight so that discharging ability of the ink composition is not lowered due to high viscosity, and that the ink composition is prevented from remarkably running on a medium for printing such as paper.

Furthermore, an organic solvent having low boiling point, as a solvent, may be added to the water-based ink composition for ink-jet printing of the present invention in addition to the above organic solvent having high boiling point and the penetrating solvent. The organic solvent having low boiling point shows effect for shortening drying time of ink.

In particular, preferable example of the organic solvent having low boiling point is, for instance, a monovalent alcohol such as methanol, ethanol, n-propanol, i-propanol, n-butanol, sec-butanol, t-butanol, i-butanol or n-pentanol.

It is desired that the content of the organic solvent having low boiling point in the water-based ink composition for ink-jet printing is 0.5 to 10% by weight, preferably 1.5 to 6% by weight.

The kind of water used in the water-based ink composition for ink-jet printing of the present invention is not particularly limited. Pure water, purified water and ion-exchange water which are used in usual ink compositions can be used. The amount of the water is suitably adjusted so that the content of the pigment in the water-based ink composition for ink-jet printing is included in the range of 0.5 to 25% by weight, as mentioned above.

From the viewpoints of effects for keeping humidity of ink and for prevention of blinding of head, it is preferable that sugar is added to the water-based ink composition for ink-jet printing of the present invention.

Examples of the sugar are, for instance, monosaccharide, disaccharide, oligosaccharide (trisaccharide and tetrasaccharide are included) and polysaccharide. Concretely, preferable examples of the sugar are, for instance, glucose, mannose, fructose, ribose, xylose, arabinose, galactose, aldose, maltose, cellobiose, lactose, sucrose, trehalose, maltotriose, maltotetraose and the like. The polysaccharide widely means sugar. Substances which are widely exist in the natural world, such as alginic acid, α-cyclodextrin and cellulose are included in the polysaccharide.

Examples of a derivative of the above sugar are, for instance, reducing sugar of the above sugar, such as sugar alcohol represented by the formula: $HOCH_2(CHOH)_pCH_2OH$ in which p is an integer of 2 to 5; oxidizing sugar of the above sugar, such as aldonic acid or uronic acid; amino acid; thiosugar; and the like. Among them, the sugar alcohol is particularly preferable. Concrete examples of the sugar alcohol are, for instance, maltitol, sorbitol and the like.

It is desired that the content of the sugar in the water-based ink composition for ink-jet printing is at least 0.1% by weight, preferably at least 0.5% by weight so that effects for keeping humidity of ink and for preventing blinding of head are sufficiently exhibited. It is desired that the content of the sugar in the water-based ink composition for ink-jet printing is at most 40% by weight, preferably at most 35% by weight so that discharging ability of the ink composition is not lowered due to high viscosity, and that water resistance of the ink composition on a medium for printing such as paper is not lowered.

As occasion demands, the other additive such as a penetrating agent, a pH adjuster, an antiseptic or an antimildew agent can be added to the water-based ink composition for ink-jet printing of the present invention.

A method for preparing the water-based ink composition for ink-jet printing of the present invention is not particularly limited. For instance, the amount of each of the pigment, the dispersing resin, the surface active agent, the organic solvent and the other additive is suitably adjusted, and they are mixed with each other to give a mixture. The mixture and water is mixed with each other to give a mixture solution, and the mixture solution is dispersed with glass beads in a sand mill. Then, the dispersed mixture is filtrated with a membrane filter.

In the obtained water-based ink composition for ink-jet printing of the present invention, the pigment is uniformly dispersed with the dispersing resin.

It is desired that the volume average particle size of dispersed pigment in the water-based ink composition for ink-jet printing is at most 200 nm, preferably at most 150 nm and that coarse particles having a volume particle size of at least 500 nm, preferably at least 300 nm are not contained in the water-based ink composition for ink-jet printing so that blinding of nozzle is prevented.

The water-based ink composition for ink-jet printing of the present invention is excellent in storing stability for a long period of time as ink, discharging stability without blinding of nozzle and adhesion to medium for printing at the same time. Accordingly, the water-based ink composition for ink-jet printing can be suitably used for ink-jet printing methods.

The ink-jet printing method of the present invention is characterized by discharging drops of the above water-based ink composition for ink-jet printing, fixing the drops to a medium for printing, and printing.

The drops of the water-based ink composition for ink-jet printing is discharged and printing is carried out by using a usual ink-jet printer. As the medium for printing, plain paper such as printing paper or copy paper; and commercially available various dedicated mediums for printing can be suitably used.

A printed matter produced by the above ink-jet printing method sufficiently exhibits excellent storage stability for a long period of time based on the water-based ink composition for ink-jet printing used therein.

The water-based ink composition for ink-jet printing of the present invention is excellent in storing stability for a long period of time as ink, discharging stability without blinding of nozzle and adhesion to medium for printing at the same time. Accordingly, the water-based ink composition for ink-jet printing can be suitably used for ink-jet printing methods.

According to the ink-jet printing method using the above water-based ink composition for ink-jet printing of the present invention, the printed matter showing considerably excellent storage stability for a long period of time can be easily produced.

The water-based ink composition for ink-jet printing, the ink-jet printing method using the same and the printed matter of the present invention are more specifically described and explained by mans of the following Examples. It is to be understood that the present invention is not limited to the Examples, and various changes and modifications may be made in the invention without departing from the spirit and scope thereof.

PREPARATION EXAMPLE 1

Preparation of Dispersing Resin (a) (Copolymer (I))

A solution of 250 g of the monomer (A), 82 g of the monomer (B), 30 g of the monomer (C), 0.67 g of azobisisobutyronitrile and 350 g of benzene was added into a reaction container. After the atmosphere in the reaction container was substituted with nitrogen gas, the solution in the reaction container was subjected to thermal polymerization at 60° C. for 7.5 hours with stirring to give a reactant. After the reactant was dissolved in 3 L of methyl ethyl ketone to give a solution, the solution was precipitated with n-hexane in 7 times amount than the reactant to give a copolymer having the acid value based on carboxyl group of 65. After the copolymer was dried and ground, the ground copolymer was neutralized and dissolved with ammonia water in aqueous system to give Dispersing resin (a).

PREPARATION EXAMPLE 2

Preparation of Dispersing Resin (b) (Copolymer (II))

A solution of 225 g of the monomer (D), 132 g of the monomer (E), 0.54 g of azobisisobutyronitrile and 300 g of benzene was added into a reaction container. After the atmosphere in the reaction container was substituted with nitrogen gas, the solution in the reaction container was subjected to thermal polymerization at 70° C. for 6.0 hours with stirring and continuously subjected to half-esterification with n-butanol to give a reactant. After the reactant was dissolved in 3 L of methyl ethyl ketone to give a solution, the solution was precipitated with n-hexane in 5 times amount than the reactant to give a copolymer having the acid value based on carboxyl group of 164. After the copolymer was dried and ground, the ground copolymer was neutralized and dissolved with monoethanolamine in aqueous system to give Dispersing resin (b).

PREPARATION EXAMPLE 3

Preparation of Dispersing Resin (c) (Copolymer (I))

A copolymer having the acid value based on carboxyl group of 110 was prepared in the same manner as in PREPARATION EXAMPLE 1 except that the amount of the monomer (C) was changed from 30 g to 55 g. After the copolymer was dried and ground, the ground copolymer was neutralized and dissolved with ammonia water in aqueous system to give Dispersing resin (c).

PREPARATION EXAMPLE 4

Preparation of Dispersing Resin (d) (Copolymer (II))

A copolymer having the acid value based on carboxyl group of 91 was prepared in the same manner as in PREPARATION EXAMPLE 2 except that the amount of the monomer (E) was changed from 132 g to 50 g. After the copolymer was dried and ground, the ground copolymer was neutralized and dissolved with monoethanolamine by using isopropanol as a dissolving auxiliary in aqueous system to give Dispersing resin (d).

Examples 1 to 8 and Comparative Examples 1 to 2

Pigment shown in TABLE 1 and a dispersing resin shown in TABLE 2 were mixed with each other and then, pure water was added thereto so that the content of the dispersed pigment was 25% by weight to give a mixture solution. The mixture solution was dispersed with glass beads (diameter: 1.0 mm, amount: 1.5 times than mixture solution) for 2 hours in sand mill made by Yasukawa Seisakusho Kabushiki Kaisha. After the glass beads were removed from the mixture solution, thereto were added 20.0% by weight of glycerin, 7.0% by weight of maltitol, 2.0% by weight of 2-pyrrolidon, 1.0% by weight of the surface active agent (compound represented by the above formula (VI) in which each of $R^1$ and $R^2$ was $CH_3$, each of $R^3$ and $R^4$ was $CH_2C_2H_4CH_3$, and the total of m and n was 10) and 0.9% by weight of triethanolamine to give a mixture. Then, the mixture was stirred at ordinary temperature for 20 minutes. Finally, the mixture was filtrated with a membrane filter (pore size: 5 μm) to give a water-based ink composition for ink-jet printing.

The volume average particle size of dispersed pigment in the water-based ink composition for ink-jet printing was measured and the existence of coarse particles having a volume particle size of at least 500 nm was examined. The results are shown in TABLE 3.

TABLE 1

| Example No. | Pigment Kind | Content (% by weight) |
|---|---|---|
| 1 | Pigment Black 7 | 2.5 |
| 2 | Pigment Yellow 74 | 3.5 |
| 3 | Pigment Red 122 | 3.0 |
| 4 | Pigment Blue 15:3 | 2.0 |
| 5 | Pigment Orange 43 | 3.5 |
| 6 | Pigment Green 7 | 3.5 |
| 7 | Pigment Green 7 | 3.5 |
| 8 | Pigment Green 7 | 3.5 |
| Com. Ex. No. 1 | Pigment Green 7 | 3.5 |
| 2 | Pigment Green 7 | 3.5 |

TABLE 2

| Example No. | Dispersing resin Copolymer (I) | Copolymer (II) | (I)/(II) (weight ratio) | Content based on the amount of pigment (% by weight) |
|---|---|---|---|---|
| 1 | Dispersing resin (a) | Dispersing resin (b) | 67/33 | 25 |
| 2 | Dispersing resin (a) | Dispersing resin (b) | 67/33 | 25 |
| 3 | Dispersing resin (a) | Dispersing resin (b) | 67/33 | 25 |
| 4 | Dispersing resin (a) | Dispersing resin (b) | 67/33 | 35 |
| 5 | Dispersing resin (a) | Dispersing resin (b) | 67/33 | 35 |
| 6 | Dispersing resin (a) | Dispersing resin (b) | 67/33 | 35 |
| 7 | Dispersing resin (c) | Dispersing resin (b) | 67/33 | 30 |
| 8 | Dispersing resin (a) | Dispersing resin (d) | 67/33 | 30 |
| Com. Ex. No. 1 | Dispersing resin (a) | Dispersing resin (b) | 100/0 | 30 |
| 2 | Dispersing resin (a) | Dispersing resin (b) | 0/100 | 30 |

Test Examples

Storage stability, discharging stability and adhesion of the water-based ink compositions for ink-jet printing prepared in EXAMPLES 1 to 8 and COMPARATIVE EXAMPLES 1 to 2 were examined in accordance with the following methods. The results are shown in TABLE 3.

(1) Storage Stability of Ink Composition

The water-based ink composition for ink-jet printing was put in a sample bottle and allowed to stand in a thermostat at 70° C. for 1 week.

Each viscosity of the ink composition before allowed to stand and after allowed to stand was measured by using ELD type viscometer. The difference between the viscosity before allowed to stand and the viscosity after allowed to stand was calculated, and storage stability of the ink composition was evaluated based on the following criteria for evaluation.

(Criteria for Evaluation)
A: The difference was less than 0.1 mPa·s.
B: The difference was at least 0.1 mPa·s and less than 0.15 mPa·s.
C: The difference was at least 0.15 mPa·s and less than 0.2 mPa·s.
D: The difference was at least 0.2 mPa·s and less than 0.25 mPa·s.
E: The difference was at least 0.25 mPa·s.

(2) Discharging Stability of Ink Composition

An ink-jet printer (MJ8000C made by SEIKO EPSON CORPORATION was charged with the water-based ink composition for ink-jet printing and then, 10000 sheets of printing paper (A4 size, fine paper made by SEIKO EPSON CORPORATION) were subjected to printing in a usual manner at ordinary temperature. In the case that curve and/or lack on a printed matter due to blinding of nozzle generated during printing, the nozzle was subjected to cleaning. The number of cleaning was examined and discharging stability of the ink composition was evaluated based on the following criteria for evaluation.

(Criteria for Evaluation)
A: The number of cleaning was less than 2.
B: The number of cleaning was at least 2 and less than 5.
C: The number of cleaning was at least 5 and less than 8.
D: The number of cleaning was at least 8 and less than 10.
E: The number of cleaning was at least 10.

(3) Adhesion of Ink Composition (Test of Resistance for Line Marker)

Printing procedure by using the water-based ink composition for ink-jet printing was repeated in the same manner as in the above item (2) Discharging stability of ink composition. After the produced printed matter was dried for at least 1 day, the surface of the printed matter was rubbed with a water-based fluorescent pen (commercial name: ZEBRA PEN2 made by ZEBRA Co., Ltd., color: yellow) at a writing pressure of $4.9 \times 10^5$ N/m$^2$. The existence of stain on the surface of the printed matter was examined and adhesion of the ink composition was evaluated based on the following criteria for evaluation.

(Criteria for Evaluation)
A: There was no stain on the surface of the printed matter by rubbing one time.
B: There was a little stain on the surface of the printed matter by rubbing one time.
C: There was stain on the partial surface of the printed matter by rubbing one time.
D: There was stain on the whole surface of the printed matter by rubbing one time.
E: There was remarkable stain on the whole surface of the printed matter by rubbing one time.

TABLE 3

| | Water-based ink composition for ink-jet printing | | | | |
|---|---|---|---|---|---|
| | Dispersed pigment | | Property | | |
| Example No. | Volume average particle size (nm) | Coarse particles | Storage stability | Discharging stability | Adhesion |
| 1 | 122 | None | A | A | B |
| 2 | 145 | None | A | A | A |
| 3 | 139 | None | A | A | A |
| 4 | 110 | None | A | A | A |
| 5 | 164 | None | A | A | A |
| 6 | 131 | None | A | A | A |
| 7 | 127 | None | B | B | A |
| 8 | 178 | None | B | B | B |
| Com. Ex. No. 1 | 210 | None | B | C | A |
| 2 | 125 | None | D | B | E |

From the results shown in TABLE 3, it can be understood that as to all water-based ink compositions for ink-jet printing prepared in EXAMPLES 1 to 8, the difference between the viscosity before allowed to stand and the viscosity after allowed to stand at 70° C. for 1 week is less than 0.15 mPa·s, the number of cleaning is less than 5 during printing on 10000 sheets of paper and there is little stain on the surface of the printed matter by rubbing with the line marker. Accordingly, it can be understood that all water-based ink compositions for ink-jet printing prepared in EXAMPLES 1 to 8 are excellent in storage stability for a long period of time, discharging stability and adhesion to printed matter at the same time.

In addition to the ingredients used in the Examples, other ingredients can be used in the Examples as set forth in the specification to obtain substantially the same results.

What is claimed is:

1. A water-based ink composition for ink-jet printing, containing at least pigment, a dispersing resin, a surface active agent, an organic solvent and water, in which said pigment is dispersed with said dispersing resin, characterized in that said dispersing resin comprises a copolymer (I) prepared by polymerizing a monomer mixture (I) containing a monomer (A) represented by the formula (I):

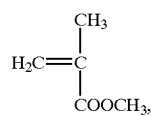

(I)

a monomer (B) represented by the formula (II):

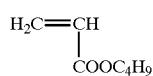

(II)

and a monomer (C) represented by the formula (III):

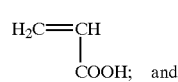

(III)

a copolymer (II) prepared by polymerizing a monomer mixture (II) containing a monomer (D) represented by the formula (IV):

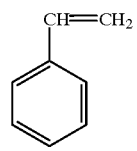

(IV)

and a monomer (E) represented by the formula (V):

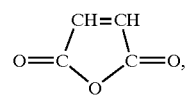

(V)

wherein said copolymer (II) is half-esterified.

2. The water-based ink composition of claim 1, wherein the weight ratio of said copolymer (I) to said copolymer (II) (copolymer (I)/copolymer (II)) is 20/80 to 98/2, and both copolymer (I) and copolymer (II) are random copolymers.

3. The water-based ink composition of claim 1, wherein the acid value based on carboxyl group of said copolymer (I) is 30 to 100 KOHmg/g, and the acid value based on carboxyl group of copolymer (II) is 100 to 250 KOHmg/g.

4. The water-based ink composition of claim 1, wherein said surface active agent is a compound represented by the formula (VI):

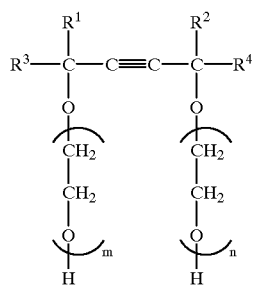

(VI)

in which each of $R^1$, $R^2$, $R^3$ and $R^4$ is independently an alkyl group having 1 to 5 carbon atoms, and the total of m and n is an integer of 1 to 40.

5. The water-based ink composition of claim 1, wherein a penetrating solvent is further contained.

6. The water-based ink composition of claim 5, wherein said penetrating solvent is an alkyl ether of polyvalent alcohol.

7. The water-based ink composition of claim 6, wherein said alkyl ether of polyvalent alcohol is at least one member selected from the group consisting of ethylene glycol monomethyl ether, ethylene glycol monobutyl ether, diethylene glycol monomethyl ether, diethylene glycol monethyl ether, diethylene glycol monobutyl ether, triethylene glycol monomethyl ether, triethylene glycol monoethyl ether and triethylene glycol monobutyl ether.

8. The water-based ink composition of claim 1, wherein sugar is further contained.

9. The water-based ink composition of claim 1, wherein the volume average particle size of dispersed pigment is at most 200 nm, and coarse particles having volume particle size of at least 500 nm are not contained.

10. An ink-jet printing method characterized by discharging drops of the water-based ink composition for ink-jet printing of claim 1, fixing said drops to a medium for printing, and printing.

11. A printed matter produced by the ink-jet printing method of claim 10.

* * * * *